(12) United States Patent
Kobayashi et al.

(10) Patent No.: US 9,188,781 B2
(45) Date of Patent: Nov. 17, 2015

(54) COMBINER STORAGE DEVICE, HEAD-UP DISPLAY DEVICE

(71) Applicant: NIPPON SEIKI CO., LTD., Niigata (JP)

(72) Inventors: Mitsugu Kobayashi, Niigata (JP); Yuji Oguro, Niigata (JP); Genichiro Sato, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/388,703

(22) PCT Filed: Mar. 7, 2013

(86) PCT No.: PCT/JP2013/056264
§ 371 (c)(1),
(2) Date: Sep. 26, 2014

(87) PCT Pub. No.: WO2013/146161
PCT Pub. Date: Mar. 10, 2013

(65) Prior Publication Data
US 2015/0212323 A1    Jul. 30, 2015

(30) Foreign Application Priority Data

Mar. 29, 2012  (JP) ................................ 2012-078121
Dec. 27, 2012  (JP) ................................ 2012-283774

(51) Int. Cl.
*G02B 27/14* (2006.01)
*G02B 27/01* (2006.01)
(52) U.S. Cl.
CPC .... *G02B 27/0149* (2013.01); *G02B 2027/0154* (2013.01); *G02B 2027/0161* (2013.01)

(58) Field of Classification Search
CPC .................................................. G02B 27/0172
USPC ......................................................... 359/630
See application file for complete search history.

(56) References Cited

U.S. PATENT DOCUMENTS

2010/0046082 A1* 2/2010 Croy et al. ................... 359/632
2012/0176683 A1* 7/2012 Rumpf et al. ................ 359/632

FOREIGN PATENT DOCUMENTS

| JP | 2007-182132 A | 7/2007 |
| JP | 2008-037309 A | 2/2008 |
| JP | 2009-515768 A | 4/2009 |
| JP | 2010-184506 A | 8/2010 |
| JP | 2011-025716 A | 2/2011 |

OTHER PUBLICATIONS

International Search Report issued in PCT/JP2013/056264, dated Jun. 4, 2013, with English translation.

* cited by examiner

*Primary Examiner* — James Jones
(74) *Attorney, Agent, or Firm* — McDermott Will & Emery LLP

(57) ABSTRACT

A combiner storage device is equipped with: a holder for holding a combiner; a first connection section that can rotate about a first fixed shaft, said first fixed shaft being positioned at one end of the first connection section, and the other end of the first connection section being connected to the holder; and a second connection section that can rotate about a second fixed shaft, said second fixed shaft being positioned at one end of the second connection section, and the other end of the second connection section being connected to the holder. The combiner can be moved from a projected state to a stored state by means of a four-link mechanism.

6 Claims, 9 Drawing Sheets

(a)

(b)

(a)

(b)

(a)

(b)

(a)

(b)

COMBINER STORAGE DEVICE, HEAD-UP DISPLAY DEVICE

RELATED APPLICATIONS

This application is the U.S. National Phase under 35 U.S.C. §371 of International Application No. PCT/JP2013/056264, filed on Mar. 7, 2013, which in turn claims the benefit of Japanese Application No. 2012-078121, filed on Mar. 29, 2012, and Japanese Application No. 2012-283774, filed on Dec. 27, 2012, the disclosures of which Applications are incorporated by reference herein.

TECHNICAL FIELD

The present invention relates to a combiner storage device, and a head-up display device provided with the combiner storage device.

BACKGROUND ART

There is a known head-up display (HUD), which is installed in a dashboard of a vehicle, for example, and is configured to notify a user or a driver of vehicle information such as a vehicle speed so as to be displayed as superimposed on a front landscape. Patent Literature 1 discloses a HUD device, which comprises a display unit (a light source 8) for generating information to be displayed, a combiner (a plate 1) for reflecting a display light emitted from the display unit toward a user, an electric motor (an element with a motor 13) for raising or storing the combiner, a lead screw connected to the electric motor, a slider that slides in a longitudinal direction along with rotation of the lead screw, and a holder that is connected to the slider and holds the combiner, wherein the combiner can be stored in a housing by power of the electric motor.

CITATION LIST

Patent Literature

Patent Literature 1: Japanese Unexamined Patent Application Publication No. 2009-515768

SUMMARY OF THE INVENTION

Problems to be Solved by the Invention

The HUD device according to the Patent Literature 1 is constructed so that a combiner is held in a projected state base on a position of a slider with respect to a lead screw (a relative position of a part where the lead screw engages with the slider). Thus, a drive mechanism of the combiner may be damaged when subjected to vibrations (particularly, when the combiner is subjected to an external force in a vertical direction due to vibrations).

The present invention has been made in view of the above circumstances. An object of the invention is to provide a combiner storage device configured to be less likely damaged even when subjected to vibrations, and a head-up display device provided with the same combiner storage device.

Means for Solving the Problem

In order to achieve the above object, a combiner storage device according to a first aspect of the invention is a combiner storage device configured to store a combiner in a housing of a head-up display device, which condenses a display light representing a display image by a combiner having a concave surface to receive the display light, and cause a viewer visually recognize the display image from the concave surface side, comprising:

a holder, which is movable with respect to the housing, and holds the combiner;

a first connection part, which is rotatable about a first axis that is extended along a horizontal direction as seen from the viewer and immovable with respect to the housing, and whose one end is located in the first axis, and the other end is connected to the holder; and a second connection part, which is rotatable about a second axis that is extended along a horizontal direction as seen from the viewer and immovable with respect to the housing, and whose one end is located in the second axis, and the other end is connected to the holder, wherein the combiner is able to be moved from a projected state projecting from the housing to a stored state being stored in the housing by means of a four-joint link mechanism assuming that the first connection part functions is a drive joint driven by a given driving force, the second connection part is a follower joint, the holder functions is an intermediate joint, and a joint connecting a center of the first axis and a center of the second axis is a fixed joint, an elastic member is provided, which connects at least one of the first connection part, the second connection part, and the holder to a part immovable with respect to the housing, and pulls a connected part by a restoring force, and the combiner is transited from the projected state to the stored state by one of the driving force and the restoring force, and transited from the stored state to the projected state by the other force.

To achieve the above object, a head-up display device according to a second aspect of the invention is characterized by comprising:

the combiner storage device; and a display unit for emitting the display light, the combiner, and the housing.

Effect of the Invention

According to the present invention, the drive mechanism of the combiner is not easily to be damaged even when subjected to vibrations.

BRIEF DESCRIPTION OF THE DRAWINGS

FIG. 5 (*a*) shows a stored state of the combiner, and FIG. 5 (*b*) shows a state in the middle of transition from a stored state to a projected state.

FIG. 7 (a) shows a projected state of the combiner, and FIG. 7 (b) shows a stored state of the combiner.

FIG. 9 (b) shows a stored state of the combiner, and FIG. 9 (a) shows a state in the middle of transition from a stored state to a projected state.

FIG. 11 (a) shows a closed state of a lid, and FIG. 11 (b) shows an open state of a lid.

MODES FOR CARRYING OUT THE INVENTION

First Embodiment

A HUD device according to a first embodiment of the invention will be explained with reference to the accompanying drawings.

Figure 1:
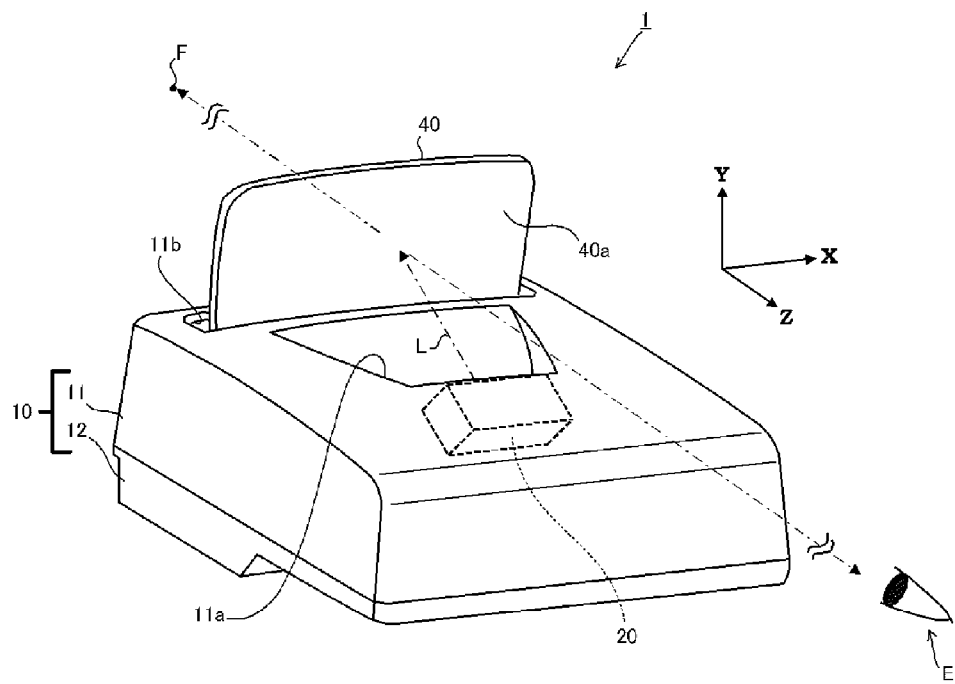
FIG. 1 is a schematic perspective view of a HUD device according to an embodiment of the present invention.
Figure 2:
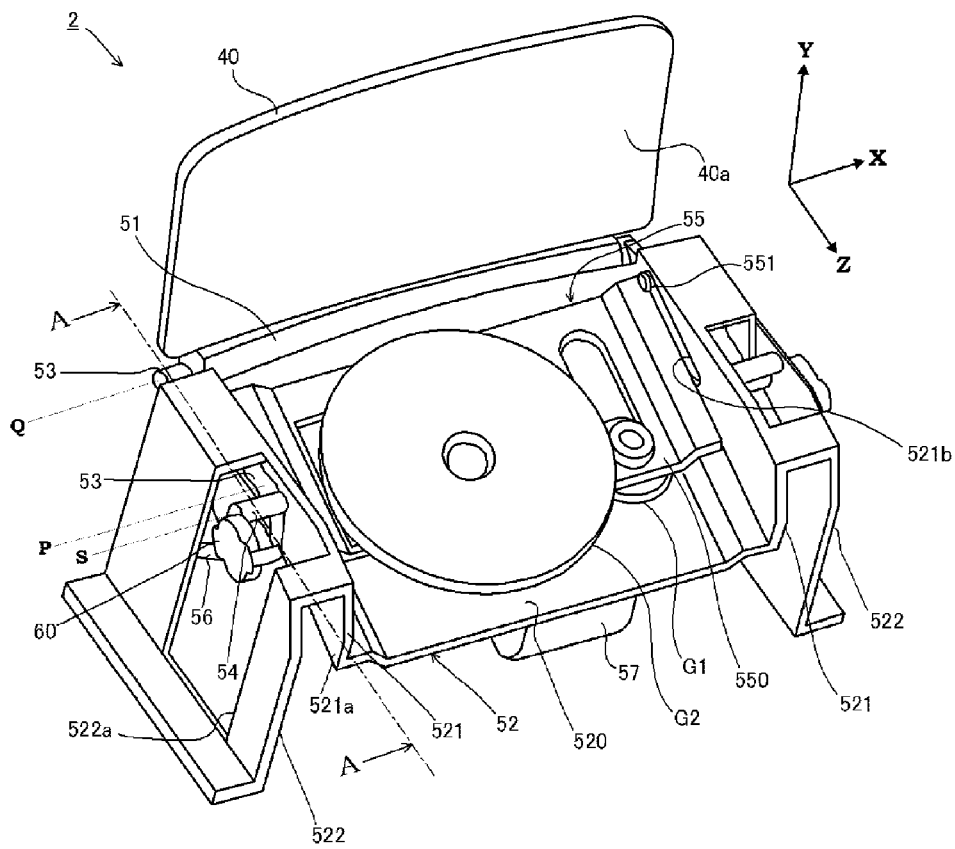
FIG. 2 is a schematic perspective view of a combiner storage device provided in the HUD device.
Figure 3:
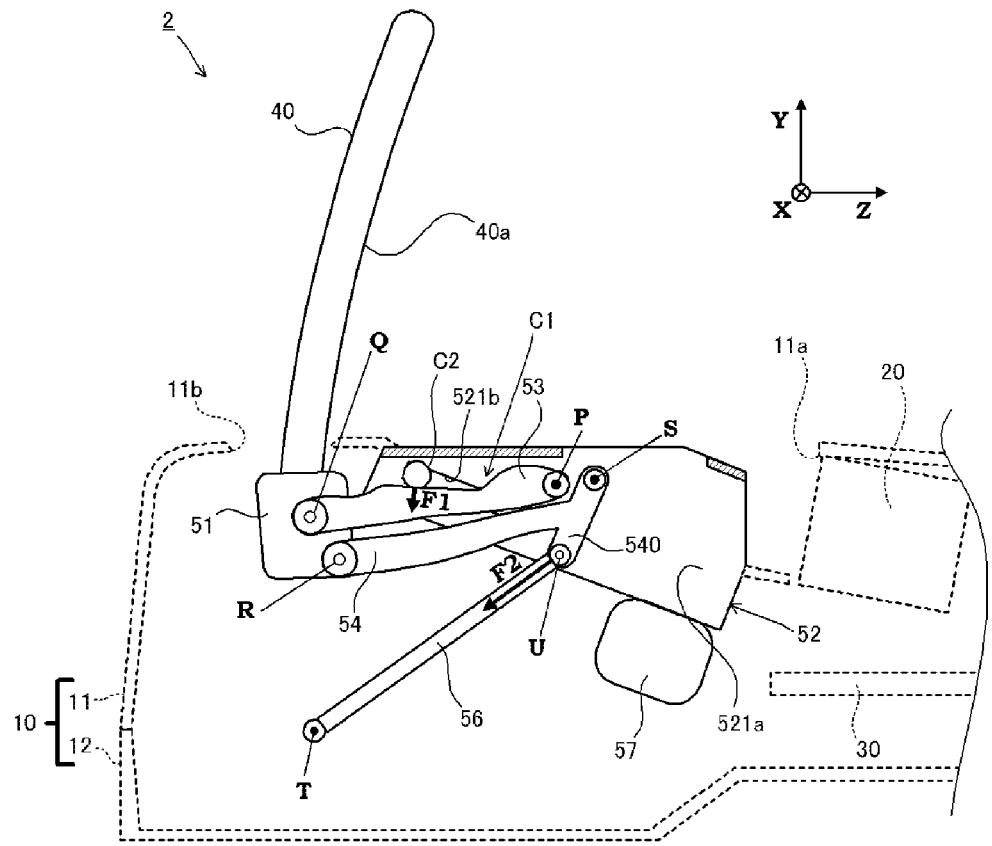
FIG. 3 shows a schematic sectional view taken along line A-A of the combiner storage device shown in FIG. 2, and a side view as seen from the −X-axis direction.

A HUD device 1 comprises, as shown in FIGS. 1 to 3, a housing 10, a display unit 20, a circuit board 30, a combiner 40, and a drive mechanism 50. The HUD device 1 is configured to be installed in a dashboard of a vehicle, for example, and notify a driver of vehicle information such as a vehicle speed, and a travel distance.

As shown in FIG. 2, a combiner storage device 2 is comprised of the combiner 40 and the drive mechanism 50.

Hereinafter, for ease of understanding the configuration of the HUD device 1, the components of the HUD device will be appropriately explained assuming that, as seen from a viewer E (see FIG. 1) recognizing a display image displayed in the HUD device 1, an axis along a horizontal direction is an X-axis, an axis along a vertical direction is a Y-axis, and an axis perpendicular to the X-axis and Y-axis is a Z-axis. Further, it is assumed that a direction pointed by an arrow of X-axis, Y-axis and Z-axis, respectively is a plus (+) direction of each axis direction, and a reverse direction is a minus (−) direction.

The housing 10 comprises an upper case 11, and a lower case 12. The upper case 11 has an exit port 11a that is an opening. The upper case 11 and lower case 12 are combined to form a box shape with an opening in the upper side. The other components, display unit 20 to drive mechanism 50, are housed in the box shaped part (the combiner 40 is housed in a stored state described later).

The upper case 11 is formed with an opening 11b that is needed when projecting the combiner 40 to a projected state described later. The opening 11b is positioned forward (−Z-axis direction side) than the exit port 11a. In a projected state, the combiner 40 is projected upward from the opening 11b as shown in FIG. 1. To the lower case 12, the circuit board 30 and a drive mechanism housing 52 of the drive mechanism 50 described later are fixed by a predetermined method.

The housing 10 is configured to prevent ingress of foreign matter and leakage of stray light (for example, an unnecessary portion of a display light L described later) from outside to inside as far as possible.

The display unit 20 is configured to emit a display light L (see the dashed line arrow in FIG. 1) representing a display image for notifying vehicle information such as a vehicle speed and a travel distance. The display unit 20 comprises a transmissive liquid crystal display consisting of a liquid crystal panel and a light source for backlight, or a self-luminous display, for example. The display unit 20 is arranged to be fixed at a predetermined position (for example, fixed to the upper case 11), so that the exit side of display light L faces a concave surface 40a described later of the combiner 40, as shown in FIG. 1 and FIG. 3. In FIG. 3, components other than the combiner storage device 2 are indicated by a dashed line.

The circuit board 30 is a printed circuit board provided with a control unit (not shown) comprising a microcomputer including a central processing unit (CPU) and a memory such as a read only memory (ROM), a graphic display controller (GDC) or the like on a plate-shaped base material made of resin or the like containing a glass fiber. The circuit board 30 is disposed below the display unit 20, for example, as shown in FIG. 3. The circuit board 30 and display unit 20 are conductively connected via a not-shown flexible printed circuit (FPC), for example. The control unit obtains vehicle state information transmitted from an external unit (not shown) such as a vehicle electronic control unit (ECU) via a communication line, and drives the display unit 20 according to the information (namely, displays a predetermined display image on the display unit 20). When the display unit 20 emits a display light L under the control of the control unit, the emitted display light L is directed to the combiner 40 through the exit port 11a.

The combiner 40 comprises a plate-shaped half mirror having a curved surface, a hologram element and the like. The combiner 40 is moved by the drive mechanism 50 from a state that the viewer E can look straight a display image by a display light L (hereinafter, referred to as a projected state) to a state stored inside the housing 10 (hereinafter, referred to as a stored state). In the projected state, the combiner 40 is seemed like projecting upward from the housing 10 (the upper case 11). In the projected state, the combiner 40 receives the display light L emitted from the display unit 20 on the concave surface 40a (generally facing in the +Z-axis direction), and changes the optical path of the incident display light L (changes the optical path of the display light L by reflection when a half mirror is used as a combiner 40, and by diffraction when a hologram element is used). The concave surface 40a of the combiner 40 has a function of condensing the display light L, and is configured as a curved surface that can form a virtual image far forward (e.g., about 1 m forward of the combiner 40) compared with simply reflecting light. The combiner 40 transmits light from the front, as well as forming a virtual image of a display image at a front position F, thereby the HUD device 1 can let the viewer E recognize both of a virtual image and an outside sconce or the like actually existing in the front.

The drive mechanism 50 is a device for moving the combiner 40 between a projected state and a stored state. As shown in FIG. 2 and FIG. 3, the drive mechanism 50 comprises a holder 51, a drive mechanism housing 52, a first connection part 53, a second connection part 54, a slider 55, an elastic member 56, and an electric motor 57. While the combiner 40 is in a projected state, the drive mechanism 50 has a function of adjusting an angle of the combiner 40.

The holder 51 is configured to hold the combiner 40, and is made of resin material, for example. As shown in FIG. 2, the holder 51 is a columnar member extending substantially in the X-axis direction. One end (a lower end in a projected state) of the combiner 40 is fixed to the holder 51 (the combiner 40 is fixed to the holder 51 by a not-shown screw or the like, for example). The holder 51 is moved with respect to the housing 10 (or the drive mechanism housing 52). Details of movement will be described later.

As shown in FIG. 2, the drive mechanism housing 52 is a substantially concaved trapezoidal member as seen from the +Z-axis direction, and made of a predetermined resin material. The drive mechanism housing 52 is fixed to the lower case 12, and immovable with respect to the housing 10.

More specifically, the drive mechanism housing 52 comprises an upper bottom part 520 spaced a predetermined distance from the bottom of the lower case 12, a wall part 521 extended upward from each of left and right ends of the upper bottom part 520, and a mounting part 522 formed substantially downward from an upper end of the wall part 521 so as to cover a four-link mechanism described later. As the mounting part 522 is fixed to the lower case 12 by a predetermined method, the drive mechanism housing 52 is secured to the lower case 12.

The first connection part 53 is a bar-shaped member made of resin material. One end of the first connection part 53 is held by the drive mechanism housing 52, and the other end is coupled (connected) to the holder 51.

More specifically, the first connection part 53 is held by a part of the drive mechanism housing 52 (an inner surface part 521*a* having a surface facing the –X-axis direction of the wall part 521) rotatably about a first axis P, which penetrates through one end of the first connection part 53, and is parallel to the X-axis. Thus, the first connection part 53 is rotated on a substantially Y-Z plane about the first axis P immovable with respect to the housing 10 (or the drive mechanism housing 52). The first connection part 53 supports the holder 51 rotatably about a first support axis Q, which penetrates through the other end, and is parallel to the X-axis.

For example, when a convex portion is formed along the first axis P in the inner surface part 521*a* of the drive mechanism housing 52, a concave portion corresponding to the convex portion is formed in one end of the first connection part 53, and these portions are connected, the first connection part 53 becomes rotatable about the first axis P. Of course, the relationship between the convex and concave portions may be reversed.

In other words, the first connection part 53 can be connected to the drive mechanism housing 52 by a joint about the first axis P. The joint has one degree of freedom. Likewise, a joint for connecting each member is configured with respect to axes Q, R and S that become a center of each joint of a four-joint link mechanism described later. A joint about each axis has one degree of freedom. Further, similarly for axes T and U located at both ends of the elastic member 56, a joint is configured about these axes. Therefore, in the following, an explanation of the joint will be omitted. In FIGS. 3 to 6 (*a*) and (*b*), the axes P, S and T immovable with respect to the housing 10 (or the drive mechanism housing 52) are represented by a black dot, and the axes Q, R and U movable with respect to the housing 10 are represented by a white dot.

The upper side portion of the first connection part 53 in a projected state forms a cam part C1 having a curved surface with a gradually changing curvature for controlling a rotation angle of the first connection part 53 about the first axis P. A cam mechanism is comprised of the cam part C1 and a contact part C2 of the slider 55 described later.

Specifically, of the curved surface shape of the cam part C1, a convex curved surface formed in a part close to the first axis P is configured to increase a ratio of rotation angle of the first connection part 53 per a travel distance of the slider 55, and formed primarily as a curved surface to cause transition from a stored state to a projected state (and vice versa). On the other hand, of the curved surface shape of the cam part C1, a concave curved surface adjacent to the convex curved surface (formed at a position far from the center of the first axis P than the first convex curved surface) is configured to decrease a ratio of rotation angle of the first connection part 53 per a travel distance of the slider 55, and formed as a curved surface for fine adjustment of an angle of the combiner 40 in a projected state (e.g., an angle of the combiner 40 formed between the optical axis and the Z-axis of the combiner 40).

In the embodiment, by the cam mechanism comprising the cam part C1 and the contact part C2 formed as described above, the operation of storing/projecting the combiner 40 and the operation of fine adjustment of angle of the combiner in a projected state are realized based on one operation of moving the slider 55. In the HUD device disclosed in the Patent Literature 1, a mechanism for moving a combiner is configured separately from a mechanism for adjusting an angle of a combiner in a projected state. Thus, the structure is complicated, and as a frequency of use increases, a risk to cause a failure may occur. However, in the HUD device according to the embodiment, as the cam mechanism realizes state transition control and fine angle adjustment of the combiner 40, the structure is simple, and a risk of failure can be decreased. Further, it is possible to suppress an increase in the number of components, and to reduce the product cost.

The second connection part 54 is a bar-shaped member made of resin material, and located below the first connection part 53 (the –Y-axis direction side) in a projected state of the combiner 40. One end of the second connection part 54 is held by the drive mechanism housing 52, and the other end is connected to the holder 51.

More specifically, the second connection part 54 is held by a part of the drive mechanism housing 52 (an inner surface part 521*a* having a surface facing the –X-axis direction of the wall part 521) rotatably about a second axis S, which penetrates through one end of the second connection part 54, and is parallel to the X-axis. Thus, the second connection part 54 is rotated on a substantially Y-Z plane about the second axis S immovable with respect to the housing 10 (or the drive mechanism housing 52). The second connection part 54 supports the holder 51 rotatably about a second support axis R, which penetrates through the other end, and is parallel to the X-axis.

The combiner storage device 2 makes the combiner 40 movable from a projected state to a stored state by a four-joint link mechanism. A four-joint link mechanism is known as a mechanism comprising a fixed joint (fixed link), a drive joint (drive link) connected to one of the joints located at both ends of the fixed link and given a driving force, a follower joint (follower link) located opposite to the drive link, and an intermediate joint (intermediate link) connecting the drive joint and the follower joint. Corresponding to this, the four-joint link mechanism provided in the combiner storage device 2 according to the embodiment is configured such that a part of the drive mechanism housing 52 (specifically, a joint connecting the center of the first axis P and the center of the second axis S) functions as a fixed joint, the first connection part 53 functions as a drive joint, the second connection part 54 functions as a follower joint, and the holder 51 functions as an intermediate joint (see FIG. 4). The centers of the axes P, Q, R and S are the centers of the adjacent joints constituting the 4-joint link mechanism.

In the 4-joint link mechanism configured as above, the first connection part 53 is given a driving force by the slider 55, the combiner 40 is transited from a projected state to a stored state by the driving force, and transited from a stored state to a projected state by a restoring force of the elastic member 56. Detailed operation will be described later.

By the description up to here, the four-joint link mechanism has been explained by referring to the left side surface (–X-axis direction side) of the combiner storage device 2. The combiner storage device 2 (or the HUD device 1) is configured substantially symmetrically. Thus, a first connection part, a second connection part or the like are similarly provided on the right side surface, constituting a four-joint link mechanism. In other words, the combiner storage device 2 moves the combiner 40 from a projected state to a stored state by the four-joint link mechanism that is similarly operated on both left and right sides of the combiner 40. Therefore, detailed explanation of the four-joint link mechanism on the right side surface will be omitted.

The slider 55 is moved in a longitudinal direction (substantially along the Z-axis direction) by power of the electric motor 57. By the movement of the slider 55, the first connection part 53 is given a driving force F1 (see FIG. 3) for storing the combiner 40 in the housing 10.

The slider 55 comprises a plate-shaped main body part 550 that moves the upper bottom part 520 of the drive mechanism housing 52 in a longitudinal direction, a sliding part 551 that projects outward from each of the left and right side surfaces of the main body part 550, and a contact part C2 that is located outside than the sliding part 551 and contacts the first connection part 53.

The sliding part 551 is a columnar member made of a sliding resin such as oil-impregnated polyacetal (POM) resin or the like, whose height direction is an X-axis direction, for example. The sliding part 551 slides in a guide part 521b provided in the wall part 521 of the drive mechanism housing 52 (FIG. 2 shows only the right side sliding part 551 and the guide part 521b, but both are provided on the left side). The guide part 521b comprises a hole that is formed in the wall part 521 and extended in a longitudinal direction (a through-hole penetrating the wall part 521 in the X-axis direction), for example, and causes the sliding part 551 to slide inside the hole (the columnar side surface of the sliding part 551 slides in the guide part 521b). As a result, the guide part 521b guides the slider 55 in a longitudinal direction.

The contact part C2 is a disk-shaped member having a diameter one size larger than that of the columnar sliding part 551, and is formed integrally with the sliding body 551, for example (namely, formed by a POM resin or the like). The sliding part 551 and contact part C2 may be made rotatable about the X-axis as well as sliding.

The contact part C2 is located outside the guide part 521b, that is, outer than the inner surface part 521a of the wall part 521. The contact part C2 contacts the first connection part 53, and when the slider 55 moves, provides the first connection part 53 power to rotate about the first axis P. Specifically, when the slider 55 moves backward (moves in the +Z-axis direction), the contact part C2 rotates the first connection part 53 counterclockwise (CCW). When the first connection part 53 rotates counterclockwise, the four-joint link mechanism moves the combiner 40 in a direction to store in the housing 10 (moves in a direction to move to a stored state).

In contrast, when the slider 55 moves forward (moves in the −Z-axis direction), the four-joint link mechanism is operated by an elastic force of the elastic member 56, and as a result, the first connection part 53 (the second connection part 54) rotates clockwise (CW). Along with the clockwise rotation, the four-joint link mechanism moves the combiner 40 in a direction to project outside the housing 10 (moves in a direction to move to a projected state).

The elastic member 56 is comprised of a metallic spring, and configured to give the four-joint link mechanism power to move the combiner 40 from a stored state to a projected state by a restoring force F2 (see FIG. 3). The elastic member 56 comprising a metallic spring, for example, connects the second connection part 54 to a part immovable with respect to the housing 10 (e.g., an inner surface part (not shown) having a surface facing the +X-axis direction of the mounting part 522 constituting the drive mechanism housing 52), and pulls the connected part (namely, the second connection part 54) by a restoring force F2.

More specifically, the elastic member 56 is held rotatably about the first connection axis T that penetrates through one end and is parallel to the X-axis, and rotatably about a second connection axis U that penetrates through the other end and is parallel to the X-axis. The first connection axis T is immovable with respect to the housing 10, and the second connection axis U is immovable with respect to the second connection part 54 (namely, movable with respect to the housing 10). The elastic member 56 pulls the second connection part 54 by a restoring force F2 in a direction from the center of the second connection axis U toward the center of the first connection axis T on the basis of the center of the first connection axis T.

In particular, an end of the elastic member 56 in which the second connection axis U of the elastic member 56 is located is connected to a part capable of rotating the second connection part 54 in a counterclockwise direction by a restoring force F2. Specifically, a projection part 540 projecting downward from the center of the second axis S is formed in the second connection part 54 in a projected state of the combiner 40. The projection part 540 is connected to the end that the second connection axis U of the elastic member 56 is located. Thus, a restoring force F2 of the elastic member 56 provides the four-joint link mechanism of the embodiment power to move the combiner 40 to a projected state.

Further, as shown in FIG. 2 (omitted in the other drawings), a rotary damper 60 is provided near the end of the second connection axis U of the elastic member 56 to appropriately control operation to prevent sudden rotation of the second connection part 54 (sudden rotation of the four-joint link mechanism). A notch 522a is provided in the mounting part 522 of the drive mechanism housing 52, to reduce the weight of the device or to facilitate mounting of the four-joint link mechanism or the like.

The electric motor 57 is a motor to give the slider 55 power to move in a longitudinal direction, and provided in the lower side (−Y-axis direction side) of the upper bottom part 520 of the drive mechanism housing 52. The electric motor 57 is conductively connected to the circuit board 30 by a not-shown FPC or the like, and rotates a drive shaft (not shown) under the control of the control unit. The drive shaft of the electric motor 57 is oriented to the +X-axis direction, for example, and rotates about the X-axis.

A helical gear (not shown) is press-fitted to the drive shaft of the electric motor 57, so that a first gear G1 with a rotation axis directed substantially to the Y-axis direction rotates via one or a plurality of gears (not shown) connected to the helical gear. On the left side of the first gear G1 in FIG. 2, a second gear G2 (directed substantially to the Y-axis direction) to be coupled to the first gear G1 is arranged. The slider 55 has a gear (not shown) to be coupled to the second gear G2 on the backside of the main body part 550, and moves in a longitudinal direction when the second gear G2 rotates. In FIG. 2, the first gear G1 and second gear G2 are shown by omitting a plurality of teeth.

In such a mechanism, a rotary power of the electric motor 57 is transmitted to the slider 55 via the first and second gears G1 and G2 or the like, and the slider 55 is moved in a longitudinal direction.

A position detection means (not shown) is provided in a predetermined part of the drive mechanism housing 52, enabling to detect whether the combiner 40 is in a projected state or a stored state. The position detection means is a linear potentiometer that detects a position of the slider 55 in a longitudinal direction, or a rotary potentiometer or the like that detects a rotation angle of the first connection part 53 about the first axis P, and a rotation angle of the second connection part 54 about the second axis S. For example, the slider 55 is located at a predetermined position when connected to the circuit board 30, the position detection means supplies the control unit with a detection signal indicating that information. Based on the detection signal, the control unit determines whether the combiner 40 is in a projected state or a stored state.

Figure 5:
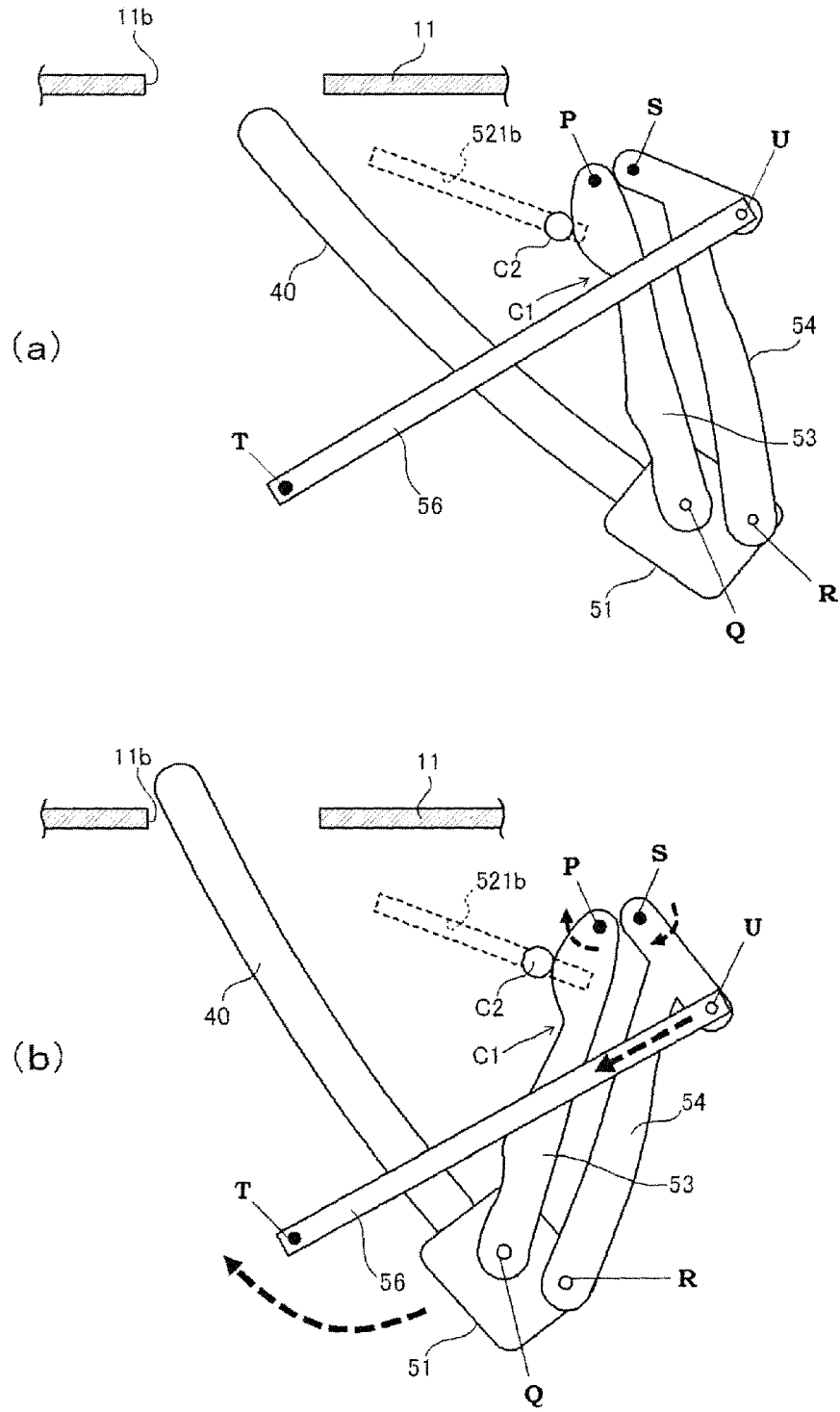
FIGS. 5 (*a*) and (*b*) are illustrations for explaining operation of the combiner storage device.

Next, how the combiner storage device 2 (or the HUD device 1) moves the combiner 40 will be explained by referring to FIGS. 5 (*a*) and (*b*) and FIGS. 6 (*a*) and (*b*). Hereinafter, how the combiner is transited from a stored state to a projected state will be mainly explained.

For example, a predetermined device installed in a dashboard of a vehicle is provided with an operation unit having a button or the like marked "ON/OFF". When a user (usually, a viewer E) presses the button, a signal indicating the user operation is supplied to the control unit. The control unit obtains the operation signal, and when the combiner 40 is in a stored state at present, executes control for transition to a projected state. Specifically, the control unit supplies the electric motor 57 with a control signal indicating the start of operation. In response to this, the electric motor 57 rotates a drive shaft at a constant speed. Then, the rotary power of the electric motor 57 is converted to a power to move the slider 55 forward, and the slider 55 is moved forward. In this manner, the HUD device 1 is transited from a stored state shown in FIG. 5 (*a*) to a state shown in FIG. 5 (*b*).

When the slider 55 moves forward, the contact part C2 moves (slides and/or moves rotationally) away from the center of the first axis P on the convex curved surface of the column part C1 of the first connection part 53. By this movement, the elastic member 56 that has been extended most in a stored state contracts (namely, pulls the second connection part 54 by a restoring force F2), and the first connection part 53 rotates about the first axis P, and the second connection part 54 rotates about the second axis S (see FIG. 5 (*b*)).

The first support axis Q and second support axis R supporting the holder 51 have been adjusted to pass through the opening 11*b* of the upper case 11 when the combiner 40 moves. Further, though not shown in the drawing, the device may be configured to provide a lid part to close the opening 11*b* in a stored state, and to open the lid part following the four-link mechanism when the combiner 40 is transited to a projected state. By configuring in this manner, it is possible to prevent ingress of foreign matter such as dust into the housing 10 in a stored state, and reduce a risk of failure.

When the contact part C2 is located in a predetermined part on the concave curved surface (e.g., a bottom of the concave curved surface) beyond the convex curved surface of the cam part C1, the position detection means supplies the control unit with a detection signal indicating that the combiner has been transited to a projected state. Receiving the detection signal, the control unit stops the operation of the electric motor 57. As a result, the HUD device 1 goes into the projected state shown in FIG. 6 (*a*).

An explanation will be given to fine adjustment of an angle of the combiner 40 in the projected state shown in FIG. 6 (*a*). For example, a button marked "Adjust Angle" is provided in the operation unit in addition to the button marked "ON/OFF". When the button is continuously pressed, the contact part C2 repeats moving back and forth on the concave curved surface of the cam part C1.

Specifically, while the "Adjust Angle" button is being pressed, the control unit drives the electric motor 57. For example, when the contact part C2 moves to the position shown in FIG. 6 (*b*), the position detection means supplies the control unit with a detection signal indicating the position. Corresponding to this, the control unit rotates the electric motor 57 in a direction reverse to the rotation of the drive shaft when moving to the state of FIG. 6 (*a*) from FIG. 6 (*b*). Then, the contact part C2 moves backward, and when the contact part C2 moves again to the position shown in FIG. 6 (*a*), the position detection means supplies the control unit with a detection signal indicating the position. Corresponding to this, the control unit returns the rotation of the drive shaft of the electric motor 57 to the original direction. By continuing such control while the button is being pressed, the user can appropriately adjust an angle of the combiner 40 by releasing a finger from the button when a desired angle of the combiner 40 is attained.

Figure 6:
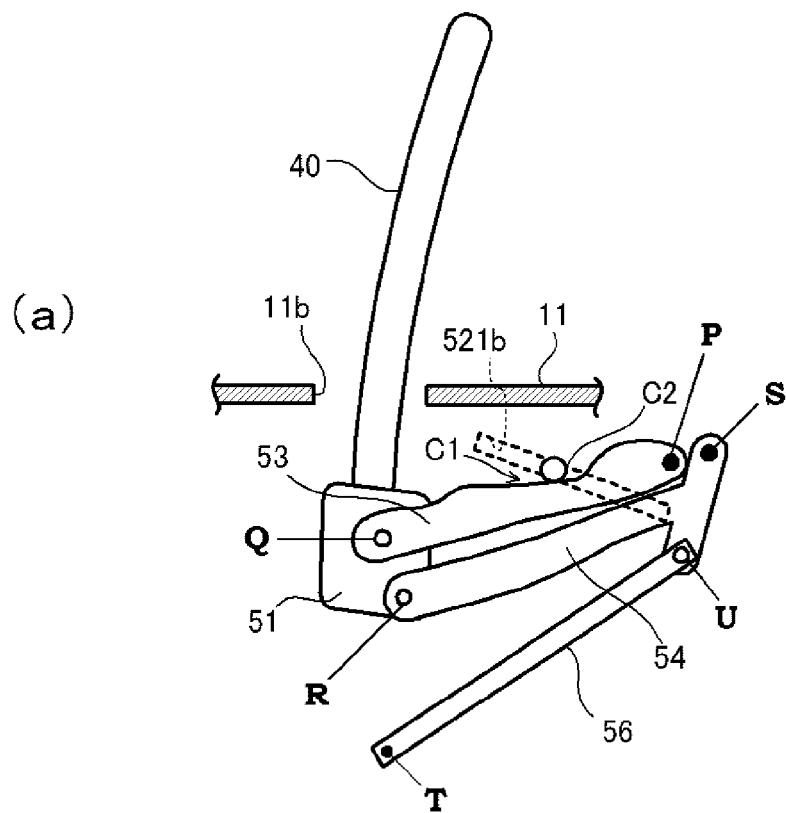
FIGS. 6 (*a*) and (*b*) are illustrations for explaining operation of the combiner storage device, and show a projected state of the combiner.
Figure 6:
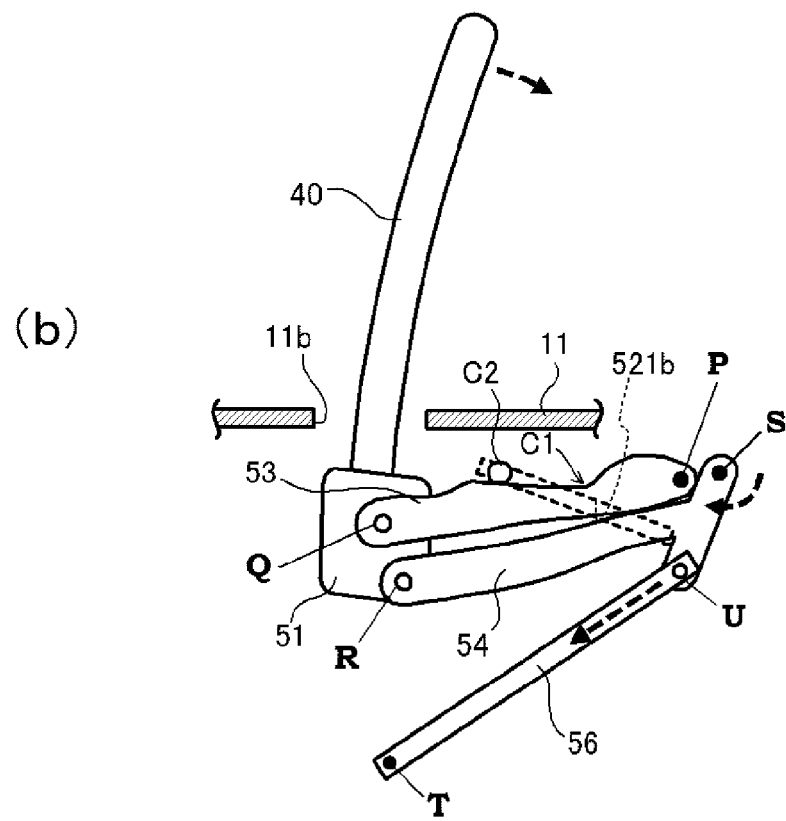

In addition, when the HUD device 1 moves to the state of FIG. 6 (*b*) from FIG. 6 (*a*), even if the contact part C2 moves forward (the slider 55 moves forward), the first connection part 53 does not substantially rotate about the first axis P due to the concave curved surface of the cam part C2. On the other hand, the second connection part 54 rotates about the second axis S, thereby the second connection part 54 is pushed forward (in the −Z-axis direction), and the combiner 40 tilts clockwise. In this manner, an angle of the combiner 40 in a projected state can be finely adjusted.

When the combiner transits from a projected state to a stored state, the HUD device 1 (or the combiner storage device 2) performs operation reverse to the above explanation.

The combiner storage device 2 having the configuration described above is a combiner storage device 2 configured to store a combiner 40 in a housing 10 of a head-up display device 1, which condenses a display light L representing a display image by a combiner 40 having a concave surface 40*a* to receive the display light L, and lets a viewer E visually recognize the display image from the concave surface side 40*a*, comprising a holder 51 (an example of a holding part), which is movable with respect to the housing 10, and holds the combiner 40; a first connection part 53, which is rotatable about a first axis P that is extended along a horizontal direction as seen from the viewer E and immovable with respect to the housing 10, and whose one end is located in the first axis P, and the other end is connected to the holder 51; and a second connection part 54, which is rotatable about a second axis S that is extended along a horizontal direction as seen from the viewer E and immovable with respect to the housing 10, and whose one end is located in the second axis S, and the other end is connected to the holder 51, wherein the combiner 40 is able to be moved from a projected state projecting from the housing 10 to a stored state being stored in the housing 10 by means of a four-joint link mechanism assuming that the first connection part 53 is a drive joint driven by a given driving force F1, the second connection part is a follower joint, the holder 51 is an intermediate joint, and a joint connecting a center of the first axis P and a center of the second axis S is a fixed joint, an elastic member 56 is provided, which connects the second connection part 54 (at least one of the first connection part 53, the second connection part 54, and the holder 51) to a part immovable with respect to the housing 10, and pulls the second connection part 54 (a connected part) by a restoring force F2, and the combiner is transited from the projected state to the stored state by a driving force F1, and transited from the stored state to the projected state by a restoring force F2.

In this configuration, even when the combiner storage device 2 is subjected to vibrations, the elastic member 56 can satisfactorily absorb the vibrations by an elastic force, suppressing an unnecessary stress applied to the drive mechanism 50 as far as possible, and the drive mechanism 50 of the combiner 40 is less likely to be damaged. Further, when an external force is applied in a vertical direction of the combiner 40 (for example, moved to a projected state from a stored state with a thing placed on the opening 11*b*), the elastic member 56 extends to absorb a shock caused by an external force. Thus, according to the combiner storage device 2, even when such a case occurs, the drive mechanism 50 of the combiner 40 is difficult to break.

The combiner storage device 2 is further provided with a contact part C2 (or the slider 55, an example of a movable body), which contacts the first connection part 53, and moves in a longitudinal direction as seen from a viewer E. When the contact part C2 moves backward, the first connection part 53 is given a driving force F1.

Further, the combiner storage device 2 is provided with a cam mechanism comprising a first connection part 53 and a contact part C2. A part (a cam part C1) contacting the contact part C2 of the first connection part 53 has a curved surface with a gradually changing curvature for controlling a rotation angle of the first connection part 53 about the first axis P.

As described above, in the combiner storage device 2, a cam mechanism realizes state transition control and fine angle adjustment of the combiner 40. Thus, the structure is simple, and a risk of failure can be reduced. In addition, it is possible to suppress an increase in the number of components, and to reduce the product cost.

Further, the HUD device 1 is provided with a combiner storage device 2, a display unit 20 for emitting a display light L, a combiner 40, and a housing 10.

The above description shows an example, in which a combiner 40 is transited from a projected state to a stored state by a driving force of a slider 55, and transited from a stored state to a projected state vice by a restoring force of an elastic member 56. However, transition of the combiner is not limited to this.

The combiner may be transited from a stored state to a projected state by a driving force of a slider, and transited from a projected state to a stored state by a restoring force of an elastic member. This will be explained below as a second embodiment by referring to FIGS. 2 to 7 and FIG. 11.

Second Embodiment

Figure 7:
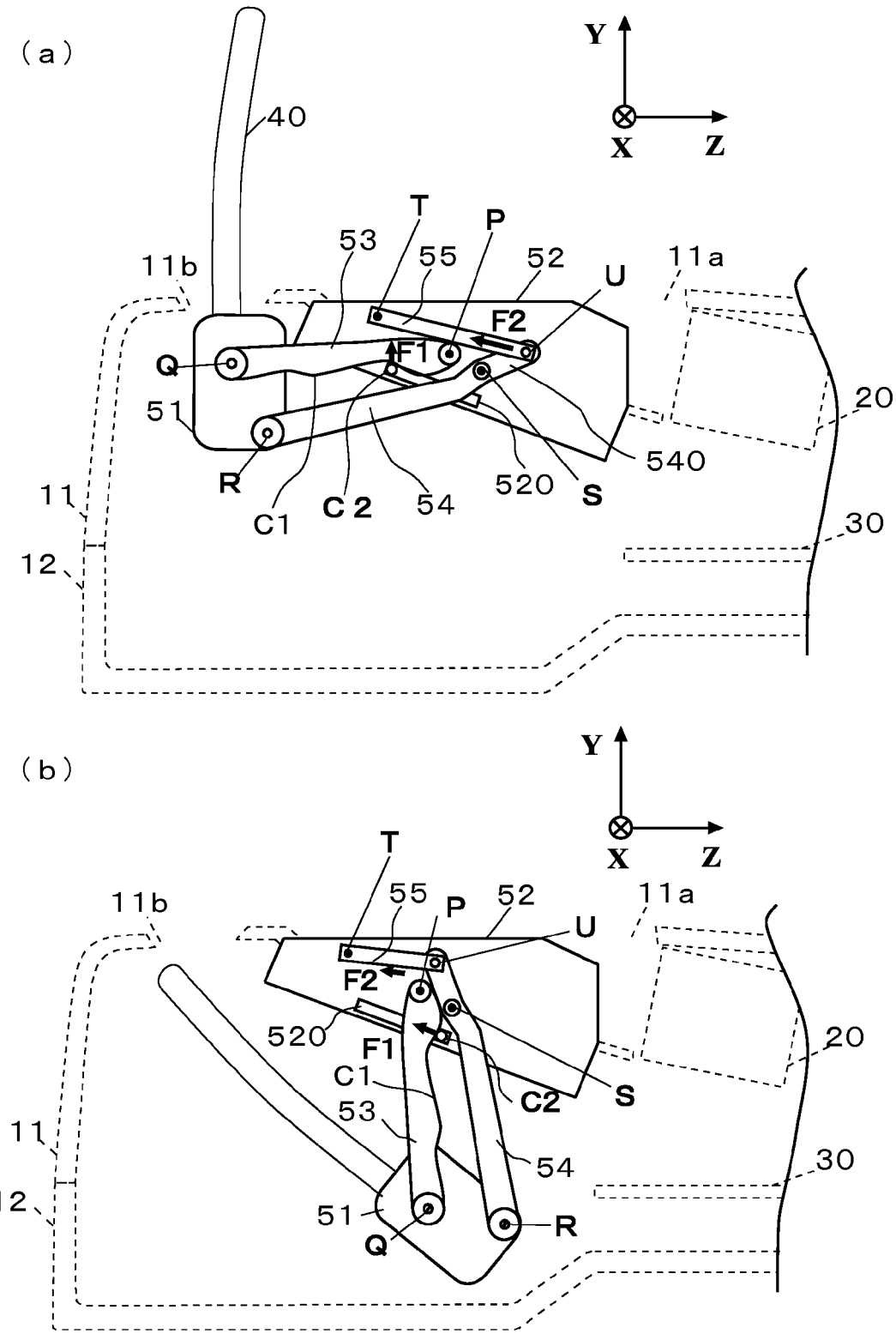
FIG. 7 shows a schematic sectional view of the combiner storage device taken along line A-A, and a side view as seen from the −X-axis direction.

In a second embodiment, a drive mechanism 50 is a mechanism for moving a combiner 40 between a "projected state" and a "stored state", and comprises a holder 51, a drive mechanism housing 52, a first connection part 53, a second connection part 54, a slider 55, a first elastic member 56, and an electric motor 57, as shown in FIG. 7, etc. The drive mechanism 50 has a function of adjusting an angle of the combiner 40 while the combiner 40 is in a projected state.

The holder 51 is configured to hold the combiner 40, and made of resin material, for example. The holder 51 is a columnar member extending substantially in an X-axis direction as shown in FIG. 2. One end (a lower end in a projected state) of the combiner 40 is fixed to the holder 51 (the combiner 40 is secured to the holder 51 by a not-shown screw or the like, for example). The holder 51 moves with respect to the housing 10 (or the drive mechanism housing 52). How the holder moves will be described later.

The drive mechanism housing 52 is a substantially concaved trapezoidal member as seen from the +Z-axis direction as shown in FIG. 2, and made of a predetermined resin material. The drive mechanism housing 52 is fixed to a lower case 12, and immovable with respect to a housing 10.

Specifically, the drive mechanism housing 52 comprises an upper bottom part 520 spaced a predetermined distance from the bottom of the lower case 12, a wall part 521 extended upward from each of left and right ends of the upper bottom part 520, and a mounting part 522 formed substantially downward from an upper end of the wall part 521 so as to cover a four-link mechanism described later. As the mounting part is fixed to the lower case 12 by a predetermined method, the drive mechanism housing 52 is secured to the lower case 12.

The first connection part 53 is a bar-shaped member made of resin material. One end of the first connection part is held by the drive mechanism housing 52, and the other end is coupled (connected) to the holder 51.

More specifically, the first connection part 53 is held by a part of the drive mechanism housing 52 (an inner surface part 521*a* having a surface facing the −X-axis direction of the wall part 521) rotatably about a first fixed axis P, which penetrates through one end, and is parallel to the X-axis. Thus, the first connection part 53 is rotated on a substantially Y-Z plane about the first fixed axis P immovable with respect to the housing 10 (or the drive mechanism housing 52). The first connection part 53 supports the holder 51 rotatably about a first support axis Q, which penetrates through the other end, and is parallel to the X-axis.

For example, when a convex portion is formed along the first fixed axis P in the inner surface part 521*a* of the drive mechanism housing 52, a concave portion corresponding to the convex portion is formed in one end of the first connection part 53, and these portions are connected, the first connection pat 53 becomes rotatable about the first fixed axis P. Of course, the relationship between the convex and concave portions may be reversed.

In other words, the first connection part 53 can be connected to the drive mechanism housing 52 by a joint about the first fixed axis P. The joint has one degree of freedom. Like the first fixed axis P, a joint for connecting each member is configured with respect to axes Q, R and S functioning as a center of each joint of a four-joint link mechanism described later. A joint about each axis has one degree of freedom. Further, similarly for the axes T and U located at both ends of the first elastic member 56, a joint is configured about these axes. Therefore, in the following, an explanation of the joint will be omitted. In FIGS. 4, 7, 9 and 10, the axes P, S and T immovable with respect to the housing 10 (or the drive mechanism housing 52) are represented by a black dot, and the axes Q, R and U movable with respect to the housing 10 are represented by a white dot.

The upper side portion of the first connection part 53 in a projected state forms a cam part C1 having a curved surface with a gradually changing curvature for controlling a rotation angle of the first connection part 53 about the first axis P. A cam mechanism is composed of the cam part C1 and a contact part C2 of the slider 55 described later.

More specifically, of the curved surface shape of the cam part C1, a convex curved surface formed in a part close to the first axis P is configured to increase a ratio of rotation angle of the first connection part 53 per a travel distance of the slider 55, and formed primarily as a curved surface to cause transition from a stored state to a projected state (and vice versa). On the other hand, of the curved surface shape of the cam part C1, a concave curved surface adjacent to the convex curved surface (formed at a position away from the center of the first axis P than the first convex curved surface) is configured to reverse a little a rotation direction of the first connection part 53 per a travel distance of the slider 55, and is formed as a curved surface to finely adjust an angle of the combiner 40 in a projected state (e.g., an angle of the combiner 40 formed between the optical axis and the Z-axis of the combiner 40).

In the embodiment, by the cam mechanism comprising the cam part C1 and the contact part C2 formed as described above, the operation of storing/projecting the combiner 40 and the operation of fine adjustment of the angle of the combiner in a projected state are realized based on one operation of moving the slider 55. In the HUD device disclosed in the Patent Literature 1, a mechanism for moving a combiner is configured separately from a mechanism for adjusting an angle of a combiner in a projected state. Thus, the structure is complicated, and when a frequency of use increases, a risk to cause a failure may occur. However, in the HUD device according to the embodiment, as the cam mechanism realizes state transition control and fine angle adjustment of the combiner 40, the structure is simple, and a risk of failure can be decreased. Further, it is possible to suppress an increase in the number of components, and to reduce the product cost.

The second connection part 54 is a bar-shaped member made of resin material, and is located below the first connection part 53 (the −Y-axis direction side) in a projected state of the combiner 40. One end of the second connection part is held by the drive mechanism housing 52, and the other end is connected to the holder 51.

More specifically, the second connection part 54 is held by a part (an inner surface part 521a having a surface facing the −X-axis direction of the wall part 521) of the drive mechanism housing 52 rotatably about a second fixed axis S, which penetrates through one end, and is parallel to the X-axis. Thus, the second connection part 54 is rotated on a substantially Y-Z plane about the second fixed axis S immovable with respect to the housing 10 (or the drive mechanism housing 52). The second connection part 54 supports the holder 51 rotatably about a second support axis R, which penetrates through the other end, and is parallel to the X-axis.

Figure 4:
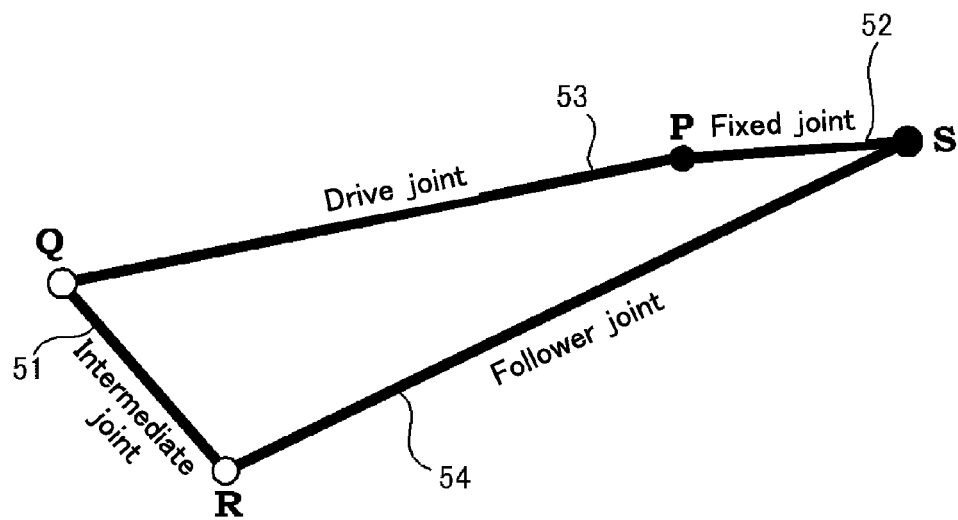
FIG. 4 is a schematic diagram for explaining a four-link mechanism of the combiner storage device.

The combiner storage device 2, as shown in FIG. 4, makes the combiner 40 movable from a projected state to a stored state by a four-joint link mechanism. A four-joint link mechanism is known as a mechanism comprising a fixed joint (fixed link), a drive joint (drive link) connected to one of the joints located at both ends of the fixed link and given a driving force, a follower joint (follower link) located opposite to the drive link, and an intermediate joint (intermediate link) connecting the drive joint and the follower joint.

Corresponding to this, the four-joint link mechanism provided in the combiner storage device 2 according to the embodiment is configured such that a part of the drive mechanism housing 52 (specifically, a joint connecting the center of the first axis P and the center of the second axis S) functions as a fixed joint, the first connection part 53 functions as a drive joint, the second connection part 54 functions as a follower joint, and the holder 51 functions as an intermediate joint (see FIG. 4 and FIG. 7). The centers of the axes P, Q, R and S are the centers of the adjacent joints constituting the 4-joint link mechanism.

In the 4-joint link mechanism configured as above, the first connection part 53 is given a driving force by the slider 55, the combiner 40 is transited from a stored state to a projected state by the driving force, and the combiner 40 is transited from a projected state to a stored state by a restoring force of the first elastic member 56. Detailed operation will be described later.

In the above description, the four-joint link mechanism is explained by referring to the left side surface (−X-axis direction side) of the combiner storage device 2. The combiner storage device 2 (or the HUD device 1) is configured substantially symmetrically. Thus, a first connection part, a second connection part or the like are similarly provided on the right side surface, constituting a four-joint link mechanism. In other words, the combiner storage device 2 moves the combiner 40 from a projected state to a stored state by the four-joint link mechanism that is operated similarly on both left and right sides of the combiner 40. Thus, detailed explanation of the four-joint link mechanism on the right side surface will be omitted.

The slider 55 is moved in a longitudinal direction (substantially along the Z-axis direction) by the power of the electric motor 57. By the movement of the slider 55, the first connection part 53 is given a first driving force F1 (see FIG. 7) for storing the combiner 40 in the housing 10.

The slider 55 comprises a plate-shaped main body part 550 for moving the upper bottom part 520 of the drive mechanism housing 52 in a longitudinal direction, a sliding part 551 for projecting outward from each of the left and right side surfaces of the main body part 550, and a contact part C2 that is located outside than the sliding part 551 and contacts the first connection part 53.

The sliding part 551 is a columnar member made of a sliding resin such as oil-impregnated polyacetal (POM) resin or the like, whose height direction is an X-axis direction, for example. The sliding part 551 slides in a guide part 521b provided in the wall part 521 of the drive mechanism housing 52 (FIG. 2 shows only the right side sliding part 551 and guide part 521b, but both are provided on the left side). The guide part 521b comprises a hole that is formed in the wall part 521 and extended in a longitudinal direction, for example, and causes the sliding part 551 to slide inside the hole (the columnar side surface of the sliding part 551 slides the guide part 521b). As a result, the guide part 521b guides the slider 55 in a longitudinal direction.

The contact part C2 is a disk-shaped member having a diameter one size larger than that of the columnar sliding part 551, and is formed integrally with the sliding body 551, for example (namely, formed by a POM resin or the like). The sliding part 551 and contact part C2 may be made rotatable about the X-axis as well as sliding.

The contact part C2 is located outside the guide part 521b, that is, outer than the inner surface part 521a of the wall part 521. The contact part C2 contacts the first connection part 53, and when the slider 55 moves, provides the first connection part 53 power to rotate about the first axis P. More specifically, when the slider 55 moves forward (moves in the −Z-axis direction), the contact part C2 rotates the first connection part 53 clockwise (CW). When the first connection part 53 rotates clockwise, the four-joint link mechanism moves the combiner 40 in a direction to project outside the housing 10 (a direction to transit to a projected state).

In contrast, when the slider 55 moves backward (moves in the +Z-axis direction), the four-joint link mechanism is operated by an elastic force of the first elastic member 56, and as a result, the first connection part 53 (the second connection part 54) rotates counterclockwise (CCW). Along with the counterclockwise rotation, the four-joint link mechanism moves the combiner 40 in a direction to store in the housing 10 (moves in a direction to transit to a stored state).

The first elastic member 56 is comprised of a metallic spring, and configured to give the four-joint link mechanism power to transit the combiner 40 from a projected state to a stored state by a first restoring force F2 (see FIG. 7). The first elastic member 56 comprising a metallic spring, for example, connects the second connection part 54 to a part immovable with respect to the housing 10 (e.g., an inner surface part 521a of the drive mechanism housing 52), and pulls the connected part (namely, the second connection part 54) by a first restoring force F2.

More specifically, the first elastic member 56 is held rotatably about the first connection axis T that penetrates through one end and is parallel to the X-axis, and rotatably about a second connection axis U that penetrates through the other end and is parallel to the X-axis. The first connection axis T is immovable with respect to the housing 10, and the second connection axis U is immovable with respect to the second connection part 54 (namely, an axis movable with respect to the housing 10). The first elastic member 56 pulls the second connection part 54 by the first restoring force F2 in a direction from the center of the second connection axis U toward the center of the first connection axis T on the basis of the center of the first connection axis T.

In particular, an end of the first elastic member 56 in which the second connection axis U is located is connected to a part capable of rotating the second connection part 54 in a counterclockwise direction by a first restoring force F2. Specifically, a projection part 540 projecting downward from the center of the second axis S is formed in the second connection part 54 in a projected state of the combiner 40. The projection part 540 is connected to the end in which the second connection axis U of the first elastic member 56 is located. Thus, the first restoring force F2 of the first elastic member 56 provides the four-joint link mechanism of the embodiment a force to move the combiner 40 to a stored state.

Further, as shown in FIG. 2, a rotary damper 60 is provided in the vicinity of the end of the second connection axis U of the first elastic member 56 to appropriately suppress operation to prevent sudden rotation of the second connection part 54 (that is, sudden operation of the four-joint link mechanism). A notch 522*a* is provided in the mounting part 522 of the drive mechanism housing 52 to reduce the weight of the device or to facilitate mounting of the four-joint link mechanism or the like.

The electric motor 57 is an actuator to give the slider 55 power to move in a longitudinal direction, and is provided in the lower side (−Y-axis direction side) of the upper bottom part 520 of the drive mechanism housing 52. The electric motor 57 is conductively connected to the circuit board 30 by a not-shown FPC or the like, and rotates a first gear G1 under the control of the control unit. A drive shaft of the electric motor 57 is oriented to the +X-axis direction, for example, and rotates about the X-axis.

Figure 8:
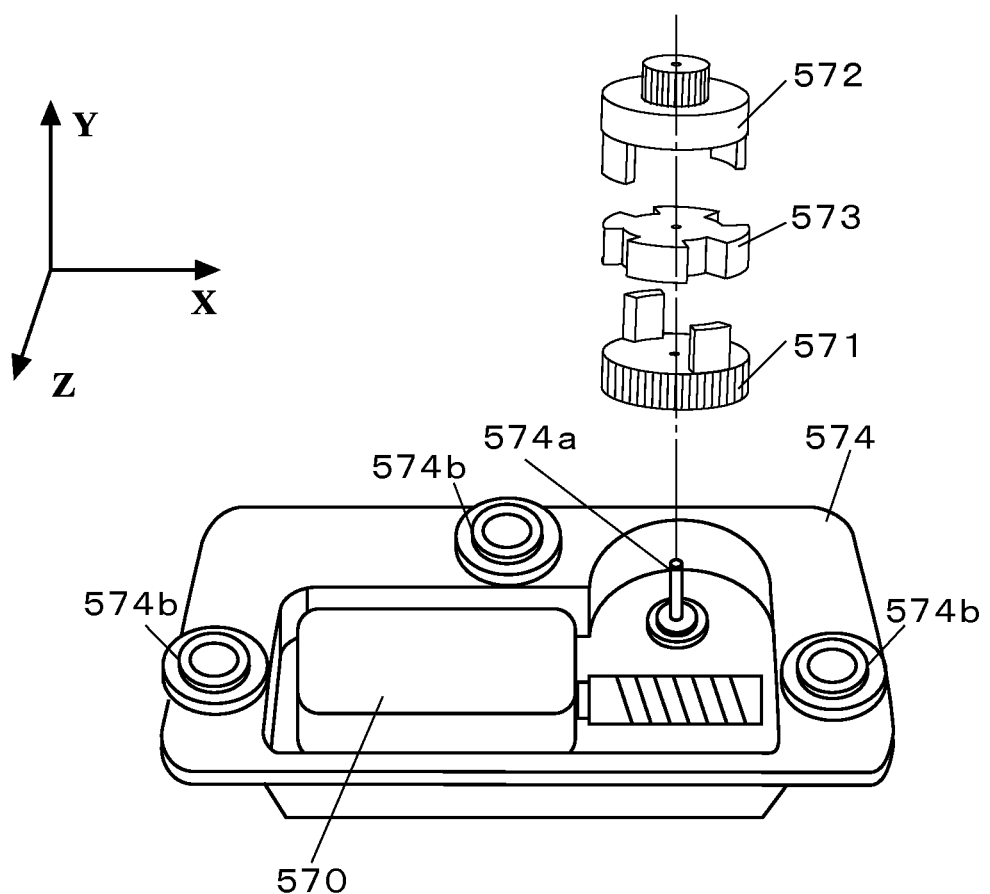
FIG. 8 is an exploded perspective view of an electric motor.

The electric motor 57 comprises, as shown in FIG. 8, a motor 570, a first gear 571, a second gear 572, an anti-vibration member 573 interposed between the first gear 571 and second gear 572, and a electric motor housing 574 having a drive shaft 574*a* and a mounting part 574*b*. The first gear 571, second gear 572 and anti-vibration member 573 are stacked in the Y-axis direction on the drive shaft 574*a*, and one helical gear (the first gear G1) is formed by coupling a recessed portion and a projected portion provided in each part. By providing the anti-vibration member 573 comprised of an elastic member between the first gear 571 connected to the motor 570 and the second gear 572 connected to the second gear G, it is possible to prevent generation of noises between the first gear G1 and the second gear G2 caused by vibrations of the motor 570 when the motor is driven. Further, vibrations from the second gear G2 become difficult to transmit to the motor 570, and a shock such as vibrations to the motor 570 can be suppressed. When mounting the electric motor 57 on the lower surface side of the upper bottom part 520 of the drive mechanism housing 52, provision of the mounting part 574*b* having a screw hole comprised of a buffer member can suppress transmission of vibrations between the electric motor 57 and the drive mechanism housing 52, and a noise caused by the vibrations. Moreover, on the left side of the first gear G1 in FIG. 2, a second gear G2 to be coupled with the first gear G1 (a rotation axis is directed substantially in the Y-axis direction) is provided. The slider 55 has a gear (not shown) to be coupled with the second gear G2 on the backside of the main body part 550, and moves in a longitudinal direction when the second gear G2 rotates. In FIG. 2, the first gear G1 and second gear G2 are shown by omitting a plurality of teeth they have.

In such a mechanism, the rotary power of the motor 570 is transmitted to the slider 55 via the first and second gears G1 and G2 or the like, and the slider 55 is moved in a longitudinal direction.

A position detection means (not shown) is provided in a predetermined part of the drive mechanism housing 52, enabling to detect whether the combiner 40 is in a projected state or a stored state. The position detection means is a linear potentiometer that detects a position of the slider 55 in a longitudinal direction, or a rotary potentiometer that detects a rotation angle of the first connection part 53 about the first axis P, a rotation angle of the second connection part 54 about the second axis S, or the like. For example, the slider 55 is located at a predetermined position when connected to the circuit board 30, the position detection means supplies the control unit with a detection signal indicating that information. Based on the detection signal, the control unit determines whether the combiner 40 is in a projected state or a stored state.

Figure 9:
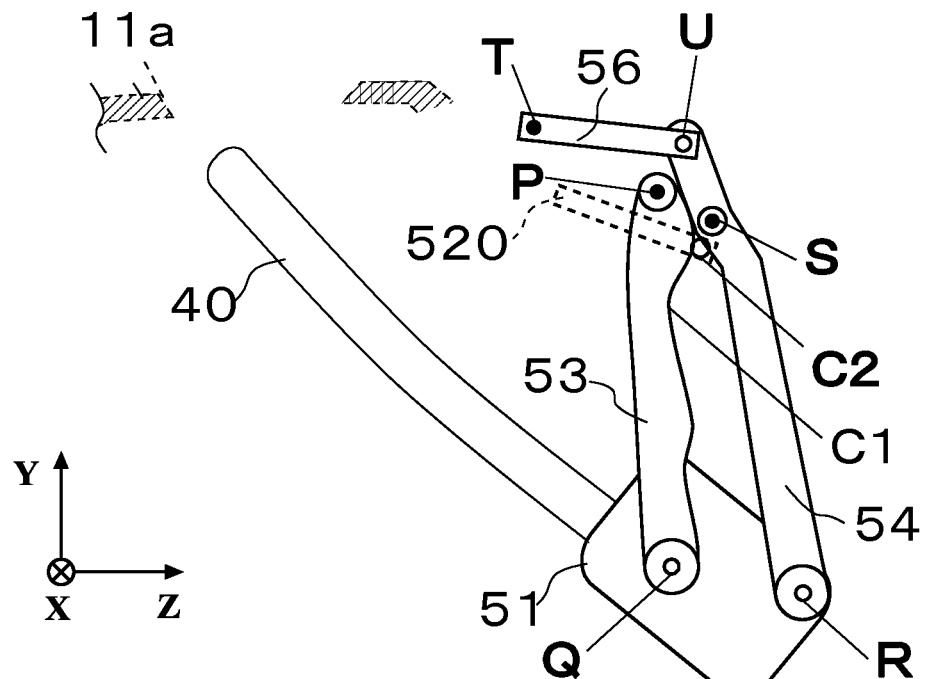
FIGS. 9 (a) and (b) are illustrations for explaining operation of the combiner storage device.
Figure 9:
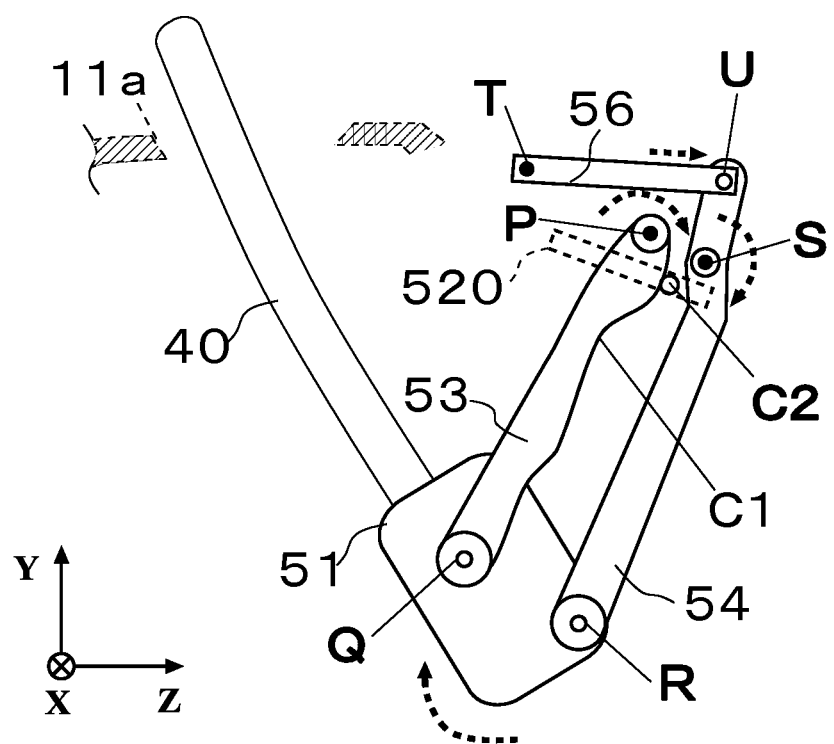

Next, how the combiner storage device 2 (or the HUD device 1) moves the combiner 40 will be explained by referring to FIGS. 9 (*a*) and (*b*) and FIGS. 10 (*a*) and (*b*). Hereinafter, how the combiner transits from a stored state to a projected state will be mainly explained.

For example, a predetermined device installed in a dashboard of a vehicle is provided with an operation unit having a button or the like marked "ON/OFF". When a user (usually, a viewer E) presses the button, a signal indicating the user operation is supplied to the control unit. The control unit obtains an operation signal, and when the combiner 40 is in a stored state at present, executes control for moving to a projected state. Specifically, the control unit supplies the electric motor 57 with a control signal indicating the start of operation. In response to this, the electric motor 57 rotates a drive shaft at a constant speed. Then, the rotary power of the electric motor 57 is converted to power to move the slider 55 forward, and the slider 55 is moved forward. In this manner, the HUD device 1 is moved from a stored state shown in FIG. 9 (*a*) to a state shown in FIG. 9 (*b*).

When the slider 55 moves forward, the contact part C2 moves (slides and/or moves rotationally) away from the center of the first axis P on the convex curved surface of the column part C1 of the first connection part 53. By this movement, the first connection part 53 rotates about the first fixed axis P, and the second connection part 54 rotates about the second fixed axis S (see FIG. 9 (*b*)). At this time, the first elastic member 56 extends from a contracted state.

The first support axis Q and second support axis R supporting the holder 51 have been adjusted to pass through the opening 11*b* of the upper case 11 when the combiner 40 moves. Further, a lid part 60 (described later) for closing the opening 11*b* in a stored state is provided, and when the combiner 40 transits to a projected state, the lid part 60 opens following the four-joint link mechanism of the combiner storage device 2. In such a configuration, it is possible to prevent ingress of foreign matter such as dust into the housing 10 in a stored state, and reduce a risk of failure.

When the contact part C2 moves to a predetermined part on the convex curved surface of the cam part C1 (e.g., a top of the convex curved surface), the position detection means supplies the control unit with a detection signal indicating that the combiner has transited to a projected state. Receiving the detection signal, the control unit stops the operation of the electric motor 57. As a result, the HUD device 1 goes into the projected state shown in FIG. 10 (*a*).

An explanation will be given to fine adjustment of an angle of the combiner 40 in the projected state shown in FIG. 10 (*a*). For example, a button marked "Adjust Angle" is provided in the operation unit in addition to the button marked "ON/OFF". When the button is continuously pressed, the contact part C2 repeats moving back and forth on the concave curved surface of the cam part C1.

Specifically, while the "Adjust Angle" button is being pressed, the control unit drives the electric motor 57. For example, when the contact part C2 moves to the position shown in FIG. 10 (*b*), the position detection means supplies the control unit with a detection signal indicating the position. Corresponding to this, the control unit rotates the electric motor 57 in a direction reverse to the rotation of the drive shaft when moving to the state of FIG. 10 (*a*) from FIG. 10 (*b*). Then, the contact part C2 moves backward, and when the contact part C2 moves again to the position shown in FIG. 10 (*a*), the position detection means supplies the control unit with a detection signal indicating the position. Then, the control unit returns the rotation of the drive shaft of the electric motor 57 to the original direction. By continuing such control while the button is being pressed, the user can appropriately adjust an angle of the combiner 40 by releasing a finger from the button when a desired angle of the combiner 40 is attained.

Figure 10:
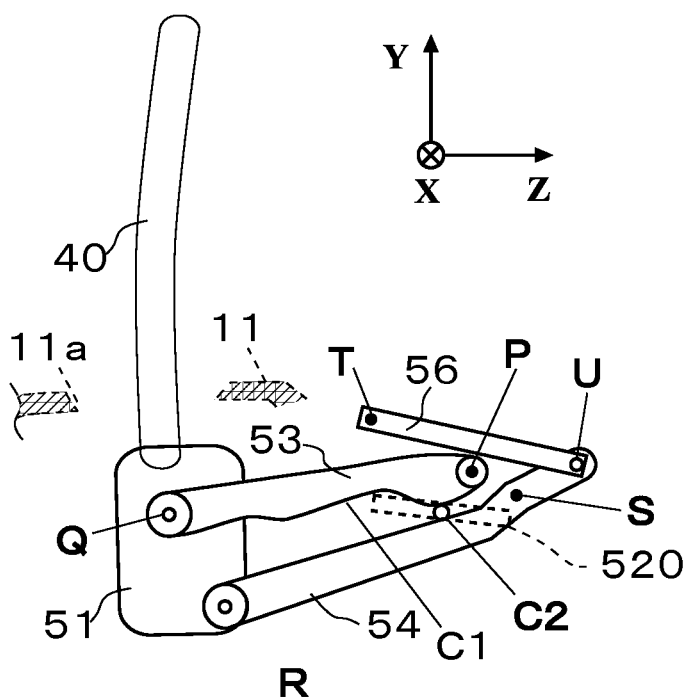
FIGS. 10 (a) and (b) are illustrations for explaining operation of the combiner storage device, and show a projected state of the combiner.
Figure 10:
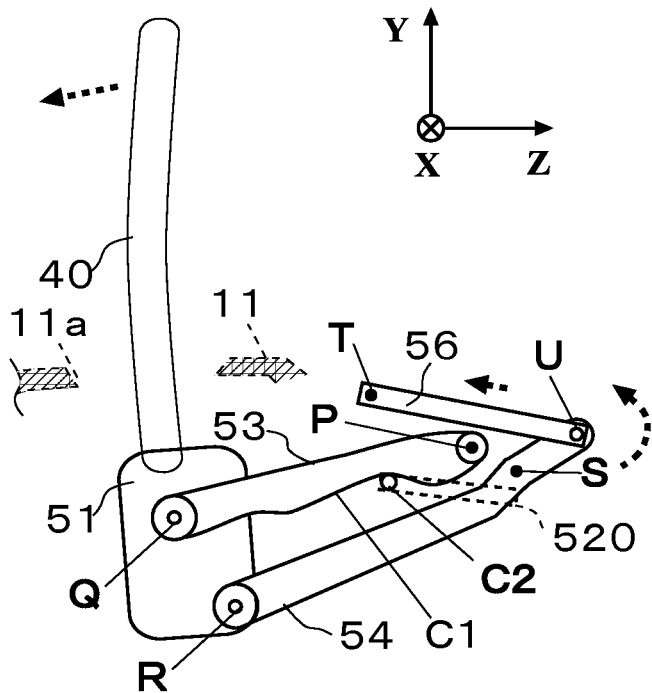

In addition, when the HUD device 1 moves to the state of FIG. 10 (*b*) from FIG. 10 (*a*), even if the contact part C2 moves forward (the slider 55 moves forward), the first connection part 53 rotates a little in a counterclockwise direction about the first fixed axis P due to the concave curved surface of the cam part C2. On the other hand, the second connection part 54 rotates in a counterclockwise direction about the second fixed axis S by a first restoring force F2, thereby the second connection part 54 is pilled backward (in the +Z-axis direction), and the combiner 40 tilts counterclockwise. In this manner, an angle of the combiner 40 in a projected state can be finely adjusted.

Figure 11:
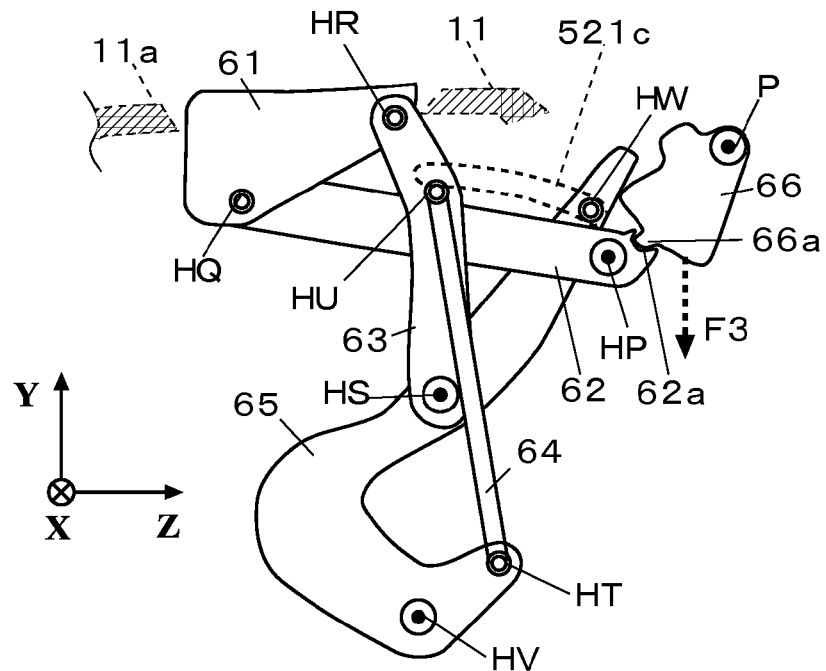
FIGS. 11 (a) and (b) are illustrations for explaining operation of a lid part.
Figure 11:
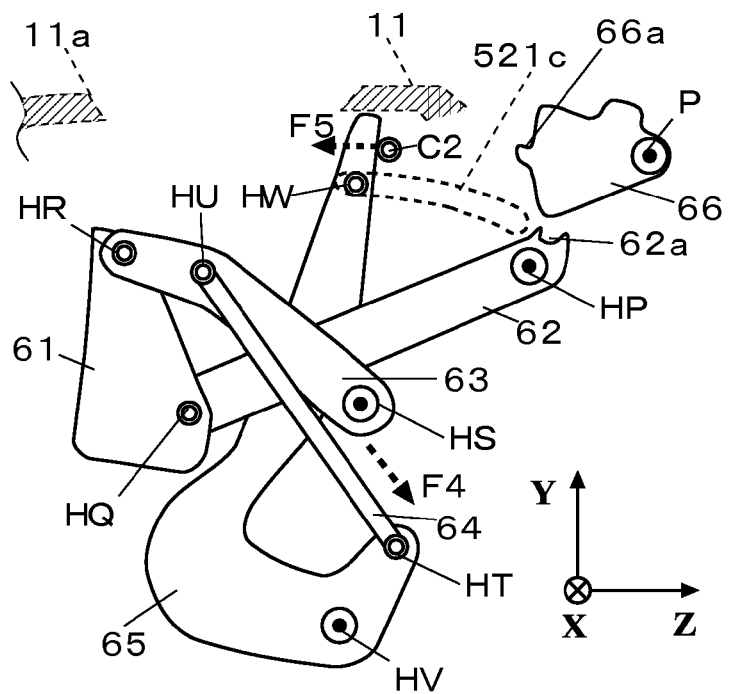

When the combiner transits from a projected state to a stored state, the HUD device 1 (or the combiner storage device 2) performs operation reverse to the above explanation. Hereinafter, the lid part 60 will be explained by using FIG. 11. FIG. 11 (*a*) shows a "closed state" of the lid part 60, and FIG. 11 (*b*) shows an "open state" of the lid part 60.

The lid part 60 comprises, as shown in FIG. 11 (*a*), a lid 61, a third connection part 62 constituting a lid open/close mechanism for moving the lid 61 between an "open state" to a "closed state", a fourth connection part 63, a second elastic member 64, an auxiliary part 65, and a press-down part 66.

The lid 61 is part to close the opening 11*b*, and made of resin material, for example. The lid 61 is a plate-shaped part extending substantially on the XZ plane in a closed state, held by the third connection part 62 and fourth connection part 63 described later, and moved with respect to the housing 10 (or the drive mechanism housing 52) based on the rotation of the third connection part 62 and fourth connection part 63.

The third connection part 62 is a bar-shaped member made of resin material. One end of the third connection part 62 is held by the drive mechanism housing 52, and the other end is coupled (connected) to the lid 61.

More specifically, the third connection part 62 is held by a part of the drive mechanism housing 52 (an inner surface part 521*a* having a surface facing the −X-axis direction of the wall part 521) rotatably about a third fixed axis HP, which penetrates through one end, and is parallel to the X-axis. Thus, the third connection part 62 is rotated on a substantially Y-Z plane about the third fixed axis HP immovable with respect to the housing 10 (or the drive mechanism housing 52). The third connection part 62 supports the holder 51 rotatably about a third support axis HQ, which penetrates through the other end, and is parallel to the X-axis. The third connection part 62 is provided with a recessed portion 62*a* to be caught by a projected portion 66*a* of the press-down part 66 described later, at a position facing the press-down part 66 in the vicinity of the third fixed axis HP. When the recessed portion 62*a* is pressed down from the projected portion 66*a* of the press-down part 66 by a second driving force F3, the third connection part 62 rotates clockwise about the third fixed axis HP (moves the lid 61 to a closed state). Further, when the press-down part 66 rotates in a counterclockwise direction about the first fixed axis P in the state of FIG. 11 (*a*), the projected portion 66*a* kicks up the recessed portion 62*a* of the third connection part 62, and at this timing, the third connection part 62 rotates in a counterclockwise direction about the third fixed axis HP (moves the lid 61 to a closed state).

For example, when a convex portion is formed along the third fixed axis HP in the inner surface part 521*a* of the drive mechanism housing 52, a concave portion corresponding to the convex portion is formed in one end of the third connection part 62, and these portions are connected, the third connection pat 62 becomes rotatable about the third fixed axis HP. Of course, the relationship between the convex and concave portions may be reversed. In other words, the third connection part 62 can be connected to the drive mechanism housing 52 by a joint about the third fixed axis HP. The joint has one degree of freedom. Likewise, a joint for connecting each member is configured with respect to the axes HQ, HR and HS functioning as a center of each joint of the four-joint link mechanism. A joint about each axis has one degree of freedom. Further, similarly for the third connection axes HT and HU located at both ends of the second elastic member 64, a joint is configured about these axes. In FIG. 11, the fixed axes HP, HS, HU and HV immovable with respect to the housing 10 (or the drive mechanism housing 52) are represented by a black dot, and the support axes H Q, HR, HT and HW movable with respect to the housing 10 are represented by a white dot.

The fourth connection part 63 is a bar-shaped member made of resin material, and intersects the third connection part 62 in the open state and closed state of the lid 61. One end of the fourth connection part is held by the drive mechanism housing 52, and the other end is connected to the lid 61.

More specifically, the fourth connection part 63 is held by a part immovable with respect to the housing 10 (an inner surface part (not shown) having a surface facing the +X-axis direction of the wall part 521 constituting the drive mechanism housing 52, for example) rotatably about a fourth fixed axis HS, which penetrates through one end, and is parallel to the X-axis. Thus, the fourth connection part 63 is rotated on a substantially Y-Z plane about the fourth fixed axis HS immovable with respect to the housing 10 (or the drive mechanism housing 52). The fourth connection part 63 supports the lid 61 rotatably about a support axis HR, which penetrates through the other end, and is parallel to the X-axis.

The second elastic member 64 is comprised of a metallic spring, and configured to give the four-joint link mechanism power to move the lid 61 from a open state to a closed state by a second restoring force F4 (see FIG. 11). The second elastic member 64 connects the fourth connection part 63 to the auxiliary part 65, and pulls the connected part (namely, the fourth connection part 63) by a second restoring force F4.

More specifically, the second elastic member 64 is held rotatably about the third connection axis HT that penetrates through one end and is parallel to the X-axis, and rotatably about a fourth connection axis HU that penetrates through the other end and is parallel to the X-axis. The third connection axis HT is immovable with respect to the auxiliary part 65 described later (namely, movable with respect to the housing 10), and the fourth connection axis HU is immovable with respect to the fourth connection part 63 (namely, movable with respect to the housing 10). The second elastic member 64 pulls the fourth connection part 63 by the second restoring force F4 in a direction from the center of the fourth connection axis HU toward the center of the third connection axis HT on the basis of the center of the third connection axis HT.

In particular, a part of the second elastic member 64 in which the fourth connection axis HU is located is connected to a part capable of rotating the fourth connection part 63 in a counterclockwise direction by the second restoring force F4.

The auxiliary part 65 is a hook-shaped member made of resin material. One end of the auxiliary part is held by the drive mechanism housing 52, and held slidably in a second guide part 521c provided in the wall part 521 of the drive mechanism housing 52. A hook-shaped front end of the auxiliary part 65 connects with the second elastic member 64, and connects with a not-shown third elastic member in a predetermined place.

Specifically, the auxiliary part 65 is held by a part of the drive mechanism housing 52 (an inner surface part 521a having a surface facing the −X-axis direction of the wall part 521) rotatably about a fifth fixed axis HV, which penetrates through one end, and is parallel to the X-axis. Of the auxiliary part 65, a sliding axis HW that is parallel to the X-axis is slidably held in the second guide part 521c provided in the wall part 521 of the drive mechanism housing 52. The auxiliary part 65 is configured to connect a not-shown third elastic member in a predetermined axis parallel to the X-axis, so as to be always subjected to a restoring force from the third elastic member to rotate in a clockwise direction about the fifth fixed axis HV.

In other words, the auxiliary part 65 is rotated in a counterclockwise direction substantially on the Y-Z plane about the fifth fixed axis HV immovable with respect to the housing 10 (or the drive mechanism housing 52) by a third drive force F5 of the contact part C2 (not shown in FIG. 11 (a)) applied to the vicinity of the sliding axis HW, and the sliding axis HW slides in the −Z-axis direction along the second guide part 521c. As a result, the third connection axis HT rotates about the fifth fixed axis HV, and changes the direction of the second restoring force F4 of the second elastic member 64 applied to the fourth connection part 63.

Further, when the contact part C2 moves in the +Z-axis direction in the state of FIG. 11 (b) (the lid 61 is in an open state), the auxiliary part 65 is rotated in a clockwise direction about the fifth fixed axis HV by a restoring force of the third elastic member (not shown), and the sliding axis HW slides in the +Z-axis direction along the second guide part 521c. As a result, the third connection axis HT rotates about the fifth fixed axis HV, and changes the direction of the second restoring force F4 of the second elastic member 64 applied to the fourth connection part 63.

The press-down part 66 is made of resin material, configured to rotate about the first fixed axis P interlocking with the rotation of the first connection part 53, and has a projected portion 66a. By the rotation of the first connection part 53 in a counterclockwise direction, the projected portion 66a engages with the recessed portion 62a of the third connection part 62, and rotates the third connection part 63 in a clockwise direction about the third fixed axis HP, thereby the lid 61 goes into a closed state. Further, the first connection part 53 rotates in a clockwise direction in the state of FIG. 11 (a) (the lid 61 is in a closed state), the projected portion 66a kicks up the recessed portion 62a of the third connection part 62, and at this timing, the third connection part 62 rotates in a counterclockwise direction about the third fixed axis HP (moves the lid 61 to a closed state).

In the lid part 60, as shown in FIG. 11, the lid 61 is movable from an open state to a closed state by means of a four-joint link mechanism. The four-joint link mechanism provided in the lid part 60 according to the embodiment is configured such that a part of the drive mechanism housing 52 (specifically, a joint connecting the center of the third fixed axis HP and the center of the fourth fixed axis HS) functions as a fixed joint, the fourth connection part 63 functions as a drive joint, the third connection part 62 functions as a follower joint, and the lid 61 functions as an intermediate joint (see FIG. 4 and FIG. 11).

In the 4-joint link mechanism configured as above, the press-down part 66 rotates based on the combiner 40 projecting/storing operation of the combiner storage device 2. As the press-down part 66 rotates, the third connection part 62 of the four-joint link mechanism of the lid part 60 rotates, thereby the lid 61 moves between an open state and a closed state.

When the combiner storage device 2 moves the combiner 40 to a projected state in the state of FIG. 11 (a), the press-down part 66 rotates in a clockwise direction about the first fixed axis P, and the projected portion 66a of the press-down part 66 kicks up the recessed portion 62a of the third connection part 62, and at this timing, the fourth connection part 63 is rotated in a counterclockwise direction about the fourth fixed axis HS by the second restoring force F4 of the second elastic member 64 (the lid 61 goes into an open state).

When the combiner storage device 2 moves the combiner 40 to a stored state in the state of FIG. 11 (b), the press-down part 66 rotates in a counterclockwise direction about the first fixed axis P, based on this, the projected portion 66a of the press-down part 66 presses down the recessed portion 62a of the third connection part 62, and the third connection part 62 is rotated in a clockwise direction about the third fixed axis HP by the second driving force F3 of the press-down part 66 (the lid 61 goes into a closed state).

By the description up to here, the four-joint link mechanism of the lid part 60 has been explained by referring to the left side surface (−X-axis direction side) of the combiner storage device 2. The combiner storage device 2 (or the HUD device 1) is configured substantially symmetrically. Thus, a third connection part, a fourth connection part or the like are similarly provided on the right side surface, constituting a four-joint link mechanism. In other words, the lid part 60 moves the lid 61 from an open state to a closed state by a four-joint link mechanism that is operated similarly on both left and right sides of the lid part 60. Therefore, detailed explanation of the four-joint link mechanism of the lid part 60 on the right side surface will be omitted.

The combiner storage device 2 having the structure described above is a combiner storage device 2 configured to store a combiner 40 in a housing 10 of a head-up display device 1, which condenses a display light L representing a display image by a combiner 40 having a concave surface 40a to receive the display light L, and lets a viewer E visually recognize the display image from the concave surface side 40a, comprising a holder 51 (an example of a holding part), which is movable with respect to the housing 10, and holds the combiner 40; a first connection part 53, which is rotatable about a first fixed axis P that is extended along a horizontal direction as seen from the viewer E and immovable with respect to the housing 10, and whose one end is located in the first fixed axis P, and the other end is connected to the holder 51; and a second connection part 54, which is rotatable about a second fixed axis S that is extended along a horizontal direction as seen from the viewer E and immovable with respect to the housing 10, and whose one end is located in the second fixed axis S, and the other end is connected to the holder 51, wherein the combiner 40 is able to be moved from a projected state projecting from the housing 10 to a stored state being stored in the housing 10 by means of a four-joint link mechanism assuming that the first connection part 53 is a drive joint driven by a given driving force F1, the second connection part is a follower joint, the holder 51 is an intermediate joint, and a joint connecting a center of the first fixed axis P and a center of the second fixed axis S is a fixed joint, an elastic member 56 is provided, which connects the second connection part 54 (at least one of the first connection part 53, the second connection part 54, and the holder 51) to a part immovable with respect to the housing 10, and pulls the second connection part 54 (a connected part) by the restoring force F2, and the combiner is transited from the projected state to the stored state by one of the driving force and the restoring force, and transited from the stored state to the projected state by the other force.

In the above configuration, even when the combiner storage device 2 is subjected to vibrations, the first elastic member 56 can always absorb vibrations satisfactorily by an elastic force, suppressing an unnecessary stress applied to the drive mechanism 50 as far as possible, and the drive mechanism 50 of the combiner 40 is less likely to be damaged. In addition, as a connection part subjected to a driving force is different from a connection part subjected to a restoring force, both connection parts (the first connection part 53 and the second connection part 54) are always subjected to the first driving force F1 or the first restoring force F2, the vibrations can be absorbed satisfactorily at all times, suppressing an unnecessary stress applied to the drive mechanism 50 as far as possible, and the drive mechanism 50 of the combiner 40 is less likely to be damaged. Further, the first elastic member 56 is not extended in a stored state of the combiner 40, this reduces the load to the first elastic member 56 and the member to engage therewith.

The combiner storage device 2 is further provided with a contact part C2 (or the slider 55, an example of a movable body), which contacts the first connection part 53, and moves in a longitudinal direction as seen from a viewer E. When the contact part C2 moves backward, the first connection part 53 is given a first driving force F1.

The combiner storage device 2 is provided with a cam mechanism comprising a first connection part 53 and a contact part C2. A part (the cam part C1) contacting the contact part C2 of the first connection part 53 has a curved surface with a gradually changing curvature for controlling a rotation angle of the first connection part 53 about the first fixed axis P.

As described above, in the combiner storage device 2, a cam mechanism realizes state transition control and fine angle adjustment of the combiner 40. Thus, the structure is simple, and a risk of failure can be reduced. In addition, an increase in the number of components is suppressed, and the product cost can be reduced.

Further, in the electric motor 57, the anti-vibration member 573 is interposed between the first gear 571 connected to the motor 570 and the second gear 572 connected to the second gear G2. This prevents generation of abnormal noise between the first gear G1 and second gear G2 caused by vibrations from the motor 570 when the motor is driven. Further, as vibrations from the second gear G2 become difficult to be transmitted to the motor 570, a shock such as vibrations to the motor 570 can be suppressed, and a risk of failure of the electric motor 57 can be reduced.

Further, the HUD device 1 comprises a combiner storage device 2, a display unit 20 for emitting a display light, a combiner 40, and a housing 10.

(Modification)

The present invention is not limited by the aforementioned embodiments and drawings. It is of course possible to modify the embodiments and drawings (including deletion of the constituent elements).

The above description shows an arrangement example in which the display unit 20 and the combiner 40 are opposed to each other, but not to be limited thereto. For example, the display unit 20 may be disposed to emit a display light L in the +Z-axis direction side, so that the display light L may reach the combiner 40 by folding an optical path by a predetermined reflection member.

The above description shows an example in which the first elastic member 56 pulls the second connection part 54. Instead of this, it is possible to provide an elastic member for pulling the first connection part 53, or an elastic member for pulling the holder 51 obliquely upward.

The above description shows an example of using a motor with a constant drive shaft rotation speed as the electric motor 57, but not to be limited thereto. The electric motor 57 may be a servomotor or a stepping motor. Controlling a drive shaft rotation angle by such a motor enables adjustment of travel speed of the slider 55 and fine angle adjustment of the combiner 40 without using a cam mechanism. However, it is better to use a cam mechanism to simplify the control.

In the above description, a vehicle is taken as an example of installing the HUD device 1 (or the combiner storage device 2), but not to be limited thereto. The HUD device 1 may be installed in the vicinity of a driver's seat in a ship, an airplane, or other transportation means. Further, the installation place is not limited to the vicinity of a driver's seat of a vehicle. It may also be applied to tabletop interiors or the like to be placed indoors.

In the above description, unimportant known techniques are appropriately omitted to facilitate understanding of the present invention.

INDUSTRIAL APPLICABILITY

The present invention can be applied as a head-up device for displaying vehicle information, for example, which is mounted on a mobile object such as an automobile, projecting a display image on a combiner, to display a virtual image.

DESCRIPTION OF REFERENCE NUMERALS

1 HUD device
2 Combiner storage device
10 Housing
20 Display unit
30 Circuit board 40 Combiner
50 Drive mechanism
51 Holder
52 Drive mechanism housing
53 First connection part
C1 Cam part
P First fixed axis
Q First support axis
54 Second connection part
S Second fixed axis
R Second support axis
55 Slider
C2 Contact part
56 Elastic member
T First connection axis
U Second connection axis
57 Electric motor
60 Lid part

The invention claimed is:

1. A combiner storage device configured to store a combiner in a housing of a head-up display device, which condenses a display light representing a display image by a combiner having a concave surface to receive the display light, and causes a viewer visually recognize the display image from the concave surface side, comprising:
   a holder, which is movable with respect to the housing, and holds the combiner;
   a first connection part, which is rotatable about a first axis that is extended along a horizontal direction as seen from the viewer and immovable with respect to the housing, and whose one end is located in the first axis, and the other end is connected to the holder; and
   a second connection part, which is rotatable about a second axis that is extended along a horizontal direction as seen from the viewer and immovable with respect to the housing, and whose one end is located in the second axis, and the other end is connected to the holder,
   wherein the combiner is able to be moved from a projected state projecting from the housing to a stored state being stored in the housing by a four-joint link mechanism assuming that the first connection part is a drive joint driven by a given driving force, the second connection part is a follower joint, the holder is an intermediate joint, and a joint connecting a center of the first axis and a center of the second axis is a fixed joint,
   an elastic member is provided, which connects at least one of the first connection part, the second connection part, and the holder to a part immovable with respect to the housing, and pulls a connected part by a restoring force, and
   the combiner is transited from the projected state to the stored state by one of the driving force and the restoring force, and transited from the stored state to the projected state by the other force.

2. The combiner storage device according to claim 1, wherein:
   the combiner is transited from the projected state to the stored state by the driving force, and
   the combiner is transited from the stored state to the projected state by the restoring force.

3. The combiner storage device according to claim 1, wherein:
   the combiner is transited from the projected state to the stored state by the restoring force, and
   the combiner is transited from the stored state to the projected state by the driving force.

4. The combiner storage device according to claim 1, further comprising:
   a movable body which contacts the first connection part, and moves in a longitudinal direction as seen from the viewer,
   wherein the movable body provides the driving force to the first connection part.

5. The combiner storage device according to claim 1, wherein:
   a cam mechanism is comprised of the first connection part and the movable body, and
   a portion of the first connection part contacting the movable body has a curved surface with a gradually changing curvature for controlling a rotation angle of the first connection part about the first axis.

6. A head-up display device comprising:
   a combiner storage device according to claim 1, and
   a display unit for emitting the display light, the combiner, and the housing.

* * * * *

UNITED STATES PATENT AND TRADEMARK OFFICE
CERTIFICATE OF CORRECTION

PATENT NO. : 9,188,781 B2  
APPLICATION NO. : 14/388703  
DATED : November 17, 2015  
INVENTOR(S) : Mitsugu Kobayashi et al.

Page 1 of 1

It is certified that error appears in the above-identified patent and that said Letters Patent is hereby corrected as shown below:

Title Page (87) PCT Pub. Date: Delete "Mar. 10, 2013" insert --Oct. 3, 2013--

Signed and Sealed this  
Twenty-sixth Day of July, 2016

Michelle K. Lee  
*Director of the United States Patent and Trademark Office*